US010525770B2

(12) United States Patent
Balnis et al.

(10) Patent No.: US 10,525,770 B2
(45) Date of Patent: Jan. 7, 2020

(54) RUBBER COMPOSITIONS FOR RADIO DEVICES IN TIRES

(71) Applicant: Bridgestone Americas Tire Operations, LLC, Nashville, TN (US)

(72) Inventors: Craig R. Balnis, Akron, OH (US); Amy M. Randall, Akron, OH (US); Paul B. Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 155 days.

(21) Appl. No.: 15/538,787

(22) PCT Filed: Dec. 9, 2015

(86) PCT No.: PCT/US2015/064581
§ 371 (c)(1),
(2) Date: Jun. 22, 2017

(87) PCT Pub. No.: WO2016/105937
PCT Pub. Date: Jun. 30, 2016

(65) Prior Publication Data
US 2017/0368874 A1    Dec. 28, 2017

Related U.S. Application Data

(60) Provisional application No. 62/095,149, filed on Dec. 22, 2014.

(51) Int. Cl.
*B60C 1/00*       (2006.01)
*C08K 3/04*       (2006.01)
*C08K 3/36*       (2006.01)
*C08L 9/00*       (2006.01)
*C08L 7/00*       (2006.01)
*G06K 19/077*     (2006.01)
*B29D 30/00*      (2006.01)

(52) U.S. Cl.
CPC .......... *B60C 1/00* (2013.01); *C08K 3/04* (2013.01); *C08K 3/36* (2013.01); *C08L 7/00* (2013.01); *C08L 9/00* (2013.01); *G06K 19/07764* (2013.01); *B29D 2030/0077* (2013.01)

(58) Field of Classification Search
CPC .... B60C 1/00; G06K 19/07764; G06K 19/02; B29D 2030/0077; C08L 2205/22
See application file for complete search history.

(56) References Cited

U.S. PATENT DOCUMENTS

| | | | |
|---|---|---|---|
| 5,387,480 A | 2/1995 | Haluska et al. | |
| 5,426,147 A | 6/1995 | Laube et al. | |
| 5,591,794 A | 1/1997 | Fukumoto et al. | |
| 6,011,093 A * | 1/2000 | Maly | B60C 1/00 152/525 |
| 6,144,106 A | 11/2000 | Bearinger et al. | |
| 6,147,659 A | 11/2000 | Takahashi et al. | |
| 6,265,454 B1 * | 7/2001 | McNutt | C08J 11/06 521/40 |
| 6,329,915 B1 | 12/2001 | Brady et al. | |
| 6,438,193 B1 | 8/2002 | Ko | |
| 6,532,811 B2 | 3/2003 | Turner et al. | |
| 6,546,982 B1 | 4/2003 | Brown et al. | |
| 6,958,565 B1 | 10/2005 | Liu | |
| 7,009,576 B2 | 3/2006 | Adamson et al. | |
| 7,102,499 B2 | 9/2006 | Myatt | |
| 7,515,052 B2 | 4/2009 | Dixon et al. | |
| 7,692,328 B2 | 4/2010 | Yoshida et al. | |
| 7,916,033 B2 | 3/2011 | Westrick | |
| 8,072,336 B2 | 12/2011 | Uehara et al. | |
| 8,344,889 B2 | 1/2013 | Sands et al. | |
| 8,511,355 B2 | 8/2013 | Kleckner | |
| 8,743,006 B2 | 6/2014 | Yoshida et al. | |
| 8,807,438 B2 | 8/2014 | Kikuchi et al. | |
| 8,912,888 B2 | 12/2014 | Yoshida et al. | |
| 2002/0004549 A1 | 1/2002 | Custodero et al. | |
| 2004/0140030 A1 | 7/2004 | Hahn et al. | |
| 2004/0159383 A1 | 8/2004 | Adamson et al. | |
| 2004/0252072 A1 * | 12/2004 | Adamson | B60C 11/00 343/873 |
| 2005/0059308 A1 | 3/2005 | Parsons | |
| 2005/0257868 A1 | 11/2005 | Adamson | |

(Continued)

FOREIGN PATENT DOCUMENTS

| | | |
|---|---|---|
| CN | 101826163 | 9/2010 |
| CN | 103183876 | 7/2013 |

(Continued)

OTHER PUBLICATIONS

Supplementary European Search Report/Opinion for European Patent Application No. EP15874104 completed by Graham Russel dated Jun. 14, 2018 in Munich, Germany.
Machine translation of WO2016097257 Publihed on Jun. 23, 2016 owned by Michelin Rech Tech.
Supplementary European Search Report/Opinion for European Patent Application No. EP15874097 completed by Graham Russell dated Jun. 13, 2018 in Munich, Germany.
Machine translation of CN103341941 published on Sep. 10, 2013 owned by Xiamen Autotop Technology Corp.
Machine translation of CN103304855 published on Sep. 18, 2013 owned by Xiamen Autotop Technology Corp.
Supplementary European Search Report/Opinion for European Patent Application No. EP15874105 completed by Graham Russell on Jun. 15, 2018 in Munich, Germany.

(Continued)

*Primary Examiner* — Nicholas E Hill

(57) ABSTRACT

The embodiments described herein generally relate to an electronic communication module suitable for incorporating into a tire or tire retread, where the electronic communication module comprises a radio device having at least a portion of its outer surface surrounded by a rubber composition. Certain embodiments also relate to tires or tire retreads containing the electronic communication module. In addition, certain embodiments relate to methods for improving the readability of a radio device incorporated into a tire or tire retread.

23 Claims, No Drawings

(56) References Cited

U.S. PATENT DOCUMENTS

| | | | |
|---|---|---|---|
| 2006/0186210 A1 | 8/2006 | Tethrake et al. | |
| 2007/0007344 A1 | 1/2007 | Inoue et al. | |
| 2007/0107824 A1 | 5/2007 | Hahn | |
| 2008/0042851 A1 | 2/2008 | Baba et al. | |
| 2008/0066839 A1* | 3/2008 | Sandstrom | B60C 11/00 152/209.5 |
| 2008/0122704 A1 | 5/2008 | King | |
| 2008/0275327 A1 | 11/2008 | Faarbaek et al. | |
| 2009/0000718 A1 | 1/2009 | Rouckhout et al. | |
| 2009/0015415 A1 | 1/2009 | Uehara et al. | |
| 2009/0091455 A1 | 4/2009 | Baba et al. | |
| 2009/0151828 A1* | 6/2009 | Zhao | B60C 23/0493 152/152.1 |
| 2009/0284375 A1 | 11/2009 | Kuo et al. | |
| 2009/0322480 A1 | 12/2009 | Benedict | |
| 2010/0032066 A1 | 2/2010 | Nakao et al. | |
| 2010/0078487 A1 | 4/2010 | Baba et al. | |
| 2010/0096181 A1 | 4/2010 | Nakamura et al. | |
| 2010/0122757 A1 | 5/2010 | Lionetti | |
| 2010/0132860 A1* | 6/2010 | Sandstrom | C08J 9/10 152/155 |
| 2010/0134286 A1 | 6/2010 | Potyrailo et al. | |
| 2010/0200816 A1 | 8/2010 | Oohira | |
| 2010/0219252 A1 | 9/2010 | Kikuchi et al. | |
| 2011/0000969 A1 | 1/2011 | Tucker | |
| 2011/0198402 A1 | 8/2011 | Tucker | |
| 2011/0210176 A1 | 9/2011 | King | |
| 2011/0241836 A1 | 10/2011 | Yoshida et al. | |
| 2013/0143018 A1 | 6/2013 | Tan et al. | |
| 2013/0292023 A1 | 11/2013 | Bergman | |
| 2014/0002242 A1 | 1/2014 | Fenkanyn | |
| 2014/0178498 A1 | 6/2014 | Pratsinis et al. | |
| 2014/0333492 A1 | 11/2014 | Battocchio | |
| 2017/0368875 A1* | 12/2017 | Balnis | C08L 9/00 |
| 2018/0009261 A1* | 1/2018 | Balnis | C08K 3/36 |

FOREIGN PATENT DOCUMENTS

| | | |
|---|---|---|
| CN | 103304855 | 9/2013 |
| CN | 103341941 | 9/2013 |
| DE | 102012216576 | 5/2014 |
| EP | 1580041 A1 | 9/2005 |
| EP | 1995082 A1 | 11/2008 |
| FR | 2918607 | 1/2009 |
| JP | 09118780 | 5/1997 |
| JP | 2004181984 | 7/2004 |
| JP | 2005015694 A | 1/2005 |
| JP | 2007009172 A | 1/2007 |
| JP | 2007230261 | 9/2007 |
| JP | 2008083792 | 4/2008 |
| JP | 2008291206 A | 12/2008 |
| JP | 2009096979 A | 5/2009 |
| JP | 2009298329 | 12/2009 |
| JP | 2010176453 A | 8/2010 |
| JP | 2010176454 | 8/2010 |
| JP | 2011162276 | 8/2011 |
| JP | 2013206045 | 10/2013 |
| KR | 20080046816 | 5/2008 |
| KR | 20090029450 | 3/2009 |
| KR | 20100120505 | 11/2010 |
| KR | 101059589 | 8/2011 |
| WO | 1999029523 | 6/1999 |
| WO | 2005021292 A1 | 3/2005 |
| WO | 2009010642 | 1/2009 |
| WO | 2010106302 | 9/2010 |
| WO | 2014096684 | 6/2014 |
| WO | 2012124577 A1 | 7/2014 |
| WO | 2016097257 | 6/2016 |
| WO | 2016105929 | 6/2016 |
| WO | 2016105938 | 6/2016 |
| WO | 2017083251 | 5/2017 |

OTHER PUBLICATIONS

Machine translation of KR101059589B1 published on Aug. 25, 2011 owned by Kumho Tire Co Ltd.

Machine translation of WO2014096684A1 published on Jun. 26, 2014 owned by Michelin & Cie [FR].

Machine translation of DE102012216576A1 published on May 28, 2014 owned by Bayerische Motoren Werke AG.

Machine translation of WO2009010642A2 published on Jan. 22, 2009 owned by Michelin Soc Tech [FR].

Machine translation of FR2918607A1 published on Jan. 16, 2009 owned by Michelin Soc Tech [FR].

Machine translation of CN103183876A published on Jul. 3, 2013 owned by Qingdao Boyute Rubber Plastic Product Co Ltd.

Abstract of Flexible and stretchable UHF RFID tag antennas authored by Shuai Shao presented on Jun. 11, 2014 in Hague, Netherlands accessible via http://ieeexplore.ieee.org/xpl/articleDetails.jsp?arnumber=6902434.

Power transmission of uhf passive embedded authored by Shenbo Hu published on Feb. 17, 2014 in Guiyang, China.

Abstract of Power transmission performance for UHF embedded RFID system in tire authored by Shenbo Hu published on Oct. 24, 2013 accessible via http://d.wanfangdata.com.cn/Periodical_nygcxb201321019.aspx.

Abstract of Determining the dielectric properties of a car tire for an advanced tire monitoring system authored by Jasmin Grosinger published on Sep. 20, 2009 accessible via http://ieeexplore.ieee.org/xpl/articleDetails.jsp?arnumber=5379069.

Embedded UHF RFID tag antennas for automotive tire sensing authored by Shuai Shao published on Jul. 2013 accessible via http://search.proquest.com/docview/1565712955?accountid=142944.

Abstract of Broadband and flexible textile RFID tags for tires authored by Shuai Shao presented on Jul. 6, 2014 accessible via https://ieeexplore.ieee.org/abstract/document/6905079.

Abstract of Flexible 0-3 ceramic-polymer composites of barium titanate and epoxidized natural rubber authored by Subhan Salaeh published on Jun. 27, 2013 accessible via http://onlinelibrary.wiley.com/doi/10.1111/ijac.12129/abstract;sessionid=5BA95609D3F46EE3F02861AC8BC427F4.f04t03.

Machine translation of JP2007230261A published on Sep. 13, 2007 owned by Yokohoma Rubber Co Ltd.

Machine translation of KR20080046816A published on May 28, 2008 owned by Hankook Tire Co Ltd.

Machine translation of JP2010176454 published on Aug. 12, 2010 owned by Crown Cork Japan.

Machine translation of KR20100120505 published on Nov. 16, 2010 owned by Kumho Tire Co Inc.

Machine translation of JP2011162276A published on Aug. 25, 2011 owned by Bridgestone Corp.

Machine translation of JP2008083792A published on Apr. 10, 2008 owned by Hitachi Information Sys Ltd.

Machine translation of KR20090029450A published on Mar. 23, 2009 owned by Kolon Inc.

Machine translation of CN101826163 published on Sep. 8, 2010 owned by Tatwah Smartech Co Ltd.

Machine translation of JP2013206045A published on Oct. 7, 2013 owned by Tokai Rubber Ind Ltd.

Machine translation of JP2009298329A published on Dec. 24, 2009 owned by Bridgestone Corp.

Machine translation of JP2004181984A published on Jul. 2, 2004 owned by Bridgestone Corp.

Abstract of Design of a passive RFID tag antenna at 2.45 GHz for mounting on various platforms authored by Rafiqul Islam presented on Dec. 12, 2011 accessible via https://ieeexplore.ieee.org/document/6168752.

Power transmission performance for ultra high frequency embedded RFID system in tire authored by Shengbo Hu published on Nov. 1, 2013.

ISR/WO (PCT/US2015/064495) conducted by Joong Sub Han on Apr. 20, 2016 under the Korean Intellectual Property Office.

ISR/WO (PCT/US2015/064582) conducted by Joong Sub Han on Apr. 20, 2016 under the Korean Intellectual Property Office.

ISR/WO (PCT/US2016/060902) conducted by Dong Wook Lee on Feb. 22, 2017 under the Korean Intellectual Property Office.

(56) References Cited

OTHER PUBLICATIONS

Machine translation of JPH09118780A published on May 6, 1997 owned by Yokohoma Rubber Co Ltd.
Wei, T. et al. Read Range Sensitivity of Embedded RFID Tags in Tires, presented at Sep. 2015 meeting of the Tire Society.
Wei, T. et al.,Powerpoint slides accompanying presentation at Sep. 2015 meeting.
ISR/WO (PCT/US2015/064581) conducted by Joong Sub Han on Apr. 20, 2016 under the Korean Intellectual Property Office.
U.S. Appl. No. 15/770,553, filed Apr. 24, 2018 by Bridgestone Americas Tire Operations LLC with Craig R Balnis and Paul B Wilson as inventors.
Machine translation of WO2005021292A1 published on Mar. 10, 2005 owned by Omron Tateisi Electronics Co.
Machine translation of WO2012124577A1 published on Jul. 24, 2014 owned by Nitta Corp.
Machine translation of JP2009096979A published on May 7, 2009 owned by Ntn Toyo Bearing Co. Ltd.
Machine translation of JP2007009172 published on Jan. 18, 2007 owned by Sekisui Chemcial Co. Ltd.
Machine translation of JP2005015694A published on Jan. 20, 2005 owned by Asahi Glass Co. Ltd.
Karl Billen, Extended European Search Report, dated May 8, 2019, pp. 1-7, European Patent Office, Munich, Germany.
Machine translation of JP2008291206A published on Dec. 4, 2008 owned by NTN Toyo Bearing Co Ltd.
Machine translation of JP2010176453A published on Aug. 12, 2010 owned by Crown Cork Japan.

* cited by examiner

RUBBER COMPOSITIONS FOR RADIO DEVICES IN TIRES

FIELD

The present application is directed to an electronic communication module suitable for incorporating into a tire, where the electronic communication module comprises a radio device having at least a portion of its outer surface surrounded by a rubber composition of specified composition.

BACKGROUND

Electronic devices integrated in a tire can provide functions such as identification and tracking during manufacture, distribution, and use of a tire. Such devices can also function to monitor physical parameters such as pressure and temperature during use of the tire. Tire identification and monitoring devices may be passive or active depending on design and desired functions.

One type of known tire identification (or tracking) device stores a unique identification number that may be read by a remote device that obtains the information from the tire identification device. Tire manufacturers may wish to incorporate a tire identification device into each tire manufactured so that the tire may be tracked during the manufacturing process and during subsequent use on vehicles.

Tire monitoring devices may be configured to read operating conditions of the tire and transmit the information from the tire to an outside reader. Such devices may be useful to trigger alarms when certain operating conditions are met (e.g., the pressure of the tire is too low). These monitoring devices may also be configured to store the information for later retrieval.

Given the wide variety of available identification and monitoring devices, a wide variety of mounting configurations also exist for these devices. Exemplary known mounting configurations include incorporating the monitoring device into a tire sidewall, incorporating the monitoring device into the bead filler, attaching the device with a patch or adhesive to the tire sidewall, attaching the device directly to the innerliner with a patch or an adhesive, connecting the device to the rim that supports the tire, and mounting the device to the valve stem of the wheel.

SUMMARY

The embodiments described herein generally relate to an electronic communication module suitable for incorporating into a tire or tire retread, where the electronic communication module comprises a radio device having at least a portion of its outer surface surrounded by a rubber composition of specified composition. Certain embodiments also relate to the tires or tire retreads incorporating the electronic communication module. In addition, certain embodiments relate to methods for improving the readability of a radio device incorporated into a tire or tire retread.

In a first embodiment, the present disclosure is directed to an electronic communication module for a tire or tire retread comprising a radio device having at least a portion of its outer surface surrounded by a rubber composition. The rubber composition comprises 100 phr of at least one diene-based elastomer, and about 20 phr to about 130 phr of ground, cured rubber. In accordance with certain embodiments of the first embodiment, the rubber composition has a dielectric constant at 915 Megahertz (MHz) of less than 7.

In a second embodiment, the present disclosure is directed to a tire or tire retread comprising the electronic communication module of the first embodiment.

In a third embodiment, the present disclosure is directed to a method of improving the readability of a radio device upon incorporation into a tire or tire retread, the method comprising surrounding at least a portion of the outer surface of the radio device by a rubber composition, thereby forming an electronic communication module. The rubber composition according to this embodiment comprises 100 phr of at least one diene-based elastomer, and about 20 phr to about 130 phr of ground, cured rubber. In accordance with certain embodiments of the third embodiment, the rubber composition has a dielectric constant at 915 Megahertz (MHz) of less than 7.

DETAILED DESCRIPTION

Definitions

The terminology as set forth herein is for description of the embodiments only and should not be construed as limiting the invention as a whole.

As used herein, the term "cure" refers to the cross-linking of thermoset polymers. The term "cured" refers to thermoset polymers that have been cross-linked. In the context of a rubber, a cured rubber refers to a vulcanized rubber (i.e., the polymers present in the rubber composition have been cross-linked according to vulcanization techniques known in the art).

As used herein, "DBP" refers to dibutyl phthalate.

As used herein, "DBP absorption" refers to the dibutyl phthalate absorption test used to determine the structure of carbon black. The DBP absorption can be determined by various standard methods, including the method mentioned herein.

As used herein the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of particulate material, including but not limited to the carbon black and "non-reinforcing fillers" particulate material discussed herein. The nitrogen surface area can be determined by various standard methods including those mentioned below.

As used herein, the term "phr" means parts per one hundred parts rubber. The 100 parts rubber refers to 100 parts of the at least one diene based elastomer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the terms "relative permittivity" and "dielectric constant" of a material are intended to have the same meaning and are used interchangeably to refer to the ratio of the dielectric permittivity of a material to the permittivity of a vacuum. Unless otherwise indicated, the dielectric constant values disclosed herein refer to those of a cured form of the rubber composition.

Electronic Communication Module

The present disclosure generally relates to an electronic communication module suitable for incorporating into a tire or tire retread, where the electronic communication module comprises a radio device having at least a portion of its outer surface surrounded by a rubber composition of specified composition.

As discussed above, a first embodiment is directed to an electronic communication module for a tire or tire retread comprising a radio device having at least a portion of its outer surface surrounded by a rubber composition. The rubber composition comprises 100 phr of at least one diene-based elastomer, and about 20 phr to about 130 phr (including 20 phr to 130 phr) of ground, cured rubber. In accordance with certain embodiments of the first embodiment, the rubber composition has a dielectric constant at 915 Megahertz (MHz) of less than 7.

As discussed above, in a second embodiment, the present disclosure is directed to a tire or tire retread comprising the electronic communication module of the first embodiment.

Furthermore, as discussed above, in a third embodiment, the present disclosure is directed to a method of improving the readability of a radio device upon incorporation into a tire or tire retread, the method comprising surrounding at least a portion of the outer surface of the radio device by a rubber composition, thereby forming an electronic communication module. The rubber composition according to this embodiment comprises 100 phr of at least one diene-based elastomer, and about 20 phr to about 130 phr (including 20 phr to 30 phr) of ground, cured rubber. In accordance with certain embodiments of the third embodiment, the rubber composition has a dielectric constant at 915 Megahertz (MHz) of less than 7.

As used herein, "improving the readability of the radio device" refers to one or more of the following: (i) increasing the readability distance between the radio device in the electronic communication module and an external, remote communication device without necessarily increasing the power or energy applied to either device; (ii) reducing the interference or noise affecting communication between the radio device and an external, remote communication device; and (iii) avoiding or minimizing any tuning variations needed for the radio device to accurately and completely communicate with an external, remote communication device. Thus, in certain embodiments, improving the readability of the radio device comprises increasing the readability distance between the radio device in the electronic communication module and an external, remote communication device; in certain such embodiments, the improvement being measured is compared to the use of a rubber composition that substitutes an equivalent or roughly equivalent amount (within + or −25%) of N5 series, N4 series, or N3 series carbon black (such as the N330 carbon black used in comparative Example 1) for the ground, cured rubber of the first and second embodiments. In certain embodiments, the comparative rubber composition not only substitutes an equivalent or roughly equivalent amount (within + or −25%) of N5 series, N4 series, or N3 series carbon black for the ground, cured rubber of the first and second embodiments, but also contains the same ingredients other than lacking any ground, cured rubber; in certain such embodiments, the comparative rubber composition also lacks any processing aid which may be added in certain embodiments according to the present disclosure to assist in blending the ground, cured rubber. In certain embodiments, the readability distance is improved by at least about 5%, including at least 5%, at least about 10%, at least 10%, at least about 15%, at least 15%, at least about 20%, at least 20%, at least about 25%, at least 25%, at least about 30%, at least 30%, at least about 35%, at least 35%, at least about 40%, at least 40%, at least about 45%, at least 45%, at least about 50%, at least 50%, at least 100%, and associated ranges (e.g., about 25% to about 200%, 25% to 200%, etc.). In certain embodiments, the readability distance is improved by about 5% or more, including 5% or more, about 10% or more, 10% or more, about 15% or more, 15% or more, about 20% or more, 20% or more, about 25% or more, 25% or more, about 30% or more, 30% or more, about 35% or more, 35% or more, about 40% or more, 40% or more, about 45% or more, 45% or more, about 50% or more, 50% or more, about 100% or more, 100% or more, and associated ranges (e.g., about 25 to about 200%, 25% to 200%, etc.). The foregoing percentages of improvement in readability are based upon an increase in readability distance; for example, an improvement of 100% in readability distance means that the readability distance is doubled.

Certain mounting configurations for radio identification or radio monitoring devices incorporated within a tire or tire retread may prove problematic due to properties of the rubber or other materials (e.g., metal) of the tire or tire retread proximate to or adjacent to the installation location of the radio device. For example, the rubber (or other materials) of a tire or tire retread having a high permittivity may dissipate or shorten the readability distance of the radio device via the transmission or absorption of the electromagnetic waves sent to or coming from the radio device. In addition, such rubber (or other materials) of a tire or tire retread may transmit or generate noise or interference that negatively affects the readability of the radio device. The electronic communication modules of the present disclosure minimize such issues by surrounding at least a portion of the outer surface of the radio device with a rubber composition having a low relative permittivity, i.e., a low dielectric constant. The low relative permittivity (i.e., a low dielectric constant) of rubber compositions disclosed herein functions to improve the readability of the radio device (1) by minimizing loss via the transmission or absorption of the electromagnetic waves into the adjacent or proximate rubber or other materials found in the tire or tire retread, (2) by minimizing noise or interference generated or transmitted by the adjacent or proximate rubber or other materials found in the tire or tire retread, or both (1) and (2). Consequently, by minimizing (1) and/or (2), the amount of tuning necessary to accurately and completely communicate with the radio device may also be minimized or avoided.

The low relative permittivity of the rubber composition of the electronic communication modules of the present disclosure, which is sufficient to provide improvement in the readability of the radio device, is obtained by using about 20 phr to about 130 phr (including 20 phr to 130 phr) of ground, cured rubber in the rubber formulation. In accordance with certain of the first, second, and third embodiments, such a rubber composition with the low relative permittivity has a dielectric constant less than 7 at 915 MHz, including 2.5 to 7, preferably 2.5 to 5. It should be understood that the dielectric constants or permittivity of the rubber compositions, as discussed herein, are measured on the rubber compositions after curing or vulcanization, unless stated to the contrary. Preferably, the measurement of the dielectric constant or permittivity of the rubber composition is made upon a sample of rubber composition prior to using it to surround at least a portion of the outer surface of the radio device. However, if a measurement is being made upon an electronic communication device that has already had at least a portion of the outer surface of its radio device surrounded by the rubber composition, the measurement can be made either upon a sample of the same rubber composition that has not been used with the radio device or upon a sample of the rubber composition after it is removed from the outer surface of the radio device.

As discussed above, in accordance with the first, second, and third embodiments disclosed herein, the radio device of the electronic communication module has at least a portion of its outer surface surrounded by the rubber composition. In certain embodiments of the first, second, and third embodiments disclosed herein, the radio device of the electronic communication module has an antenna and a majority of the outer surface of the antenna is surrounded by the rubber composition; in yet other embodiments of the first, second, and third embodiments disclosed herein the outer surface of the antenna of the electronic communication devices is entirely surrounded by the rubber composition. In certain embodiments of the first, second, and third embodiments disclosed herein, the portion of the outer surface of the radio device of the electronic communication module that is surrounded by the rubber composition comprises at least 10%, at least 20%, at least 30%, at least 40%, at least 50%, at least 60%, at least 70%, at least 80%, at least 90%, at least 95% and 100%; in such embodiments the foregoing includes the ranges 10-50%, 10-60%, 10-70%, 10-80%, 10-90%, 10-95%, 10-100%, 20-50%, 20-60%, 20-70%, 20-80%, 20-90%, 20-95%, 20-100%, 30-50%, 30-60%, 30-70%, 30-80%, 30-90%, 30-95%, 30-100%, 40-50%, 40-60%, 40-70%, 40-80%, 40-90%, 40-95%, 40-100%, 50-60%, 50-70%, 50-80%, 50-90%, 50-95%, 50-100%, 60-70%, 60-80%, 60-90%, 60-95%, 60-100%, 70-80%, 70-90%, 70-95%, 70-100%, 80-90%, 80-95%, 80-100%, 90-95%, 90-100%, and 95-100%. In certain embodiments of the first, second, and third embodiments disclosed herein, the radio device of the electronic communication module has a majority of its outer surface surrounded by the rubber composition. The phrase "a majority" as used herein refers to greater than 50% and should be understood to encompass up to 100%. Thus, in accordance with certain of the first, second, and third embodiments, 51-100%, 51-99%, 51-95%, 51-90%, 51-80%, 51-70%, 51-60%, 60-100%, 60-99%, 60-90%, 60-80%, 60-70%, 70-100%, 70-99%, 70-95%, 70-90%, 70-80%, 80-100%, 80-99%, 80-95%, 80-90%, 90-100%, 90-99%, or 90-95% of the outer surface of the radio device is surrounded by the rubber composition of the electronic communication module. In certain embodiments, the rubber composition of the electronic communication module is in direct contact with the outer surface of the radio device. In other embodiments, one or more coatings, films, or other materials may form an intermediate layer disposed between the outer surface of the radio device and the rubber composition. Such intermediate layers may be used, for example, as a sizing or primer to improve adhesion of the outer surface of the radio device and the rubber composition. The selection and application of such an intermediate layer could be determined by one of ordinary skill in the art.

The thickness of the rubber composition that surrounds at least a portion of the outer surface of the radio device may vary. In certain embodiments of the first, second, and third embodiments disclosed herein, the thickness of the rubber composition is relatively uniform around the outer surface of the radio device. In other embodiments of the first, second, and third embodiments disclosed herein, the thickness of the rubber composition varies around the outer surface of the radio device. In certain embodiments of the first, second, and third embodiments disclosed herein, the thickness of the rubber composition that surrounds at least a portion of the outer surface of the radio device is about 0.5 mm to about 3 mm, including 0.5 mm to 3 mm, including about 1 mm to about 3 mm, and including 1 mm to 3 mm.

The rubber composition that surrounds at least a portion of the outer surface of the radio device may be placed upon the radio device using various methods. In certain embodiments, the rubber composition is placed upon the radio device as rubber sheets or layers. More specifically, in such embodiments, the rubber composition is calendered or otherwise formed into an uncured sheet of rubber having a uniform thickness (such as of about 0.5 mm or 0.5 mm). The radio device is placed onto the upper surface of the rubber sheet with a portion of the lower surface of the radio device contacting the rubber sheet. A second rubber sheet (generally having the same thickness as the first sheet) is placed over the upper surface of the radio device so that at least a portion of the outer surface of the radio device is covered by the two rubber layers. The two rubber layers are then pressed together to promote adhesion of first rubber layer to the second rubber layer with the radio device substantially captured between. Adhesion of the two rubber layers may be assisted by various means such as by using a dual roller assembly to press the components together and expel any trapped air, by stitching the layers together (such as by using a stitching roller), by manual finger pressure, by use of an inflatable bladder, by use of a compression molding fixture, or by any other means suitable for assisting in the adhesion of the two rubber layers. As discussed elsewhere herein, once the radio device has had at least a portion of its outer surface surrounded by the rubber composition, it is referred to as an electronic communication module.

Radio Device

In accordance with the first, second, and third embodiments disclosed herein, the electronic communication module includes a radio device. The radio device includes any suitable radio device known in the art capable of storing information (i.e., data), communicating information, or both storing and communicating information with another device. In certain embodiments, the radio device disclosed herein is capable of conveying information. The conveying of information by the radio device comprises the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 MHz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments, the radio devices discussed herein may be designed to convey or transmit information at another frequency range. Examples of suitable radio devices for use with the electronic communication modules disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the first-third embodiments that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

The types of radio devices useful in the embodiments disclosed herein include radio identification or tracking devices which may contain unique identifier information associated with the tire such that may be used in one or more of manufacturing, distribution, sale, and use activities associated with the tire. A specific example of a use activity includes information added during the use of a tire, such as could be added during retreading. A specific example of such identification or tracking device is a radio frequency identification device, more commonly referred to as an "RFID" device. In accordance with certain of the first, second, and third embodiments, the radio device is an RFID device. Other examples of the radio devices include radio monitoring devices capable of measuring and/or storing temperature, pressure or other physical parameters associated with an operating tire. Other examples of suitable radio devices include those with both identification and monitoring functionality.

Rubber Composition

In accordance with the first, second, and third embodiments disclosed herein, the radio device of electronic communication module has at least a portion of its outer surface surrounded by a rubber composition. The rubber composition according to the first, second, and third embodiments comprises 100 phr of at least one diene-based elastomer, and about 20 phr to about 130 phr (including 20 phr to 130 phr) of ground, cured rubber. In accordance with certain of the first, second, and third embodiments, the rubber composition disclosed herein has a dielectric constant of less than 7 at 915 MHz, including 2.5 to 7, preferably 2.5 to 5, in the cured form of the rubber composition.

Ground, Cured Rubber

As discussed above, the rubber composition according to the first, second, and third embodiments disclosed herein comprises about 20 phr to about 130 phr of ground, cured rubber, including from 20 phr to 130 phr, including from about 25 phr to about 125 phr, including from 25 phr to 125 phr, including from about 30 phr to about 110 phr, including from 30 phr to 110 phr, including from about 30 phr to about 100 phr, including from 30 phr to 100 phr, including from about 30 phr to about 90 phr, including from 30 phr to 90 phr, including from about 30 phr to about 80 phr, including from 30 phr to 80 phr, including from about 30 phr to about 70 phr, including from 30 phr to 70 phr, including from about 40 phr to about 130 phr, including from 40 phr to 130 phr, including from about 40 phr to about 120 phr, including from 40 phr to 120 phr, including from about 40 phr to about 110 phr, including from 40 phr to 110 phr, including from about 40 phr to about 100 phr, including from 40 phr to 100 phr, including from about 40 phr to about 90 phr, including from 40 phr to 90 phr, including from about 40 phr to about 80 phr, including from 40 phr to 80 phr, including from about 50 phr to about 130 phr, including from 50 phr to 130 phr, including from about 50 phr to about 120 phr, including from 50 phr to 120 phr, including from about 50 phr to about 110 phr, including from 50 phr to 110 phr, including from about 50 phr to about 100 phr carbon black, including from 50 phr to 100 phr, including from about 50 phr to about 90 phr, including from 50 phr to 90 phr, including from about 50 phr to about 80 phr, and including from 50 to 80 phr of ground, cured rubber.

Unless otherwise indicated herein, "ground, cured rubber" refers to cured, i.e., vulcanized (cross-linked) rubber that has been ground or pulverized into particulate matter having an average particle size in the range of about 50 μm to about 250 μm (including 50 μm to 250 μm), preferably an average particle size of about 74 μm to about 105 μm (including 74 μm to 105 μm. The average particle size may be measured by any conventional means known in the art including the methods according to ASTM D5644. In certain embodiments, average particle size may be measured using a mesh sieve. For example, sieves with mesh numbers ranging from 60 to 325 correspond to particle sizes of about 250 μm to about 50 μm (including 250 μm to 50 μm), respectively. Mesh numbers of 140 to 200 correspond to particle sizes of about 105 μm to about 74 μm (including 105 μm to about 74 μm), respectively.

In certain embodiments, the average particle size refers to an average particle size distribution. In accordance with such embodiments, the ground, cured rubber used in the rubber composition according to the first-third embodiments has an average particle size distribution in which at least about 80% of the particles range from about 50 μm to about 250 μm (including at least 80% of the particles range from 50 μm to 250 μm), preferably at least about 90%, at least 90%, at least about 95%, at least 95%, or even 100% of the particles range from about 50 μm to about 250 μm (including 50 μm to 250 μm). In other embodiments of the first-third embodiments, the ground, cured rubber has an average particle size distribution in which at least about 75% of the particles range from about 74 μm to about 105 μm (including at least 75% of the particles range from 74 μm to 105 μm), preferably at least about 80%, at least 80%, at least about 85%, at least 85%, at least about 90%, at least 90%, at least about 95%, at least 95%, or even 100% of the particles range from about 74 μm to about 105 μm (including 74 μm to 105 μm).

Examples of suitable sources of rubber for the ground, cured rubber include used tires. It is well known to those skilled in the art that tires are prepared from natural and synthetic rubbers that are generally compounded using fillers including carbon black and sometimes also including silica. The source of the ground, cured rubber used in accordance with the first, second, and third embodiments disclosed herein may vary, but in certain embodiments can be tires (or rubber from such tires) produced with a carbon black filler, with a silica filler, or with mixtures of both. Exemplary sources include tires from passenger cars, light trucks, or combinations of both.

With respect to the source of ground, cured rubbers containing carbon black, it should be understood the carbon black contained therein may, depending on the grade or type, provide, or at least contribute to, a high relative permittivity in the cured rubber (e.g., a cured rubber composition having a dielectric constant greater than or equal to 7), thereby deteriorating the readability of the radio device surrounded by the rubber composition in the electronic communication module. It is believed that the high relative permittivity occurs when certain grades or types of carbon blacks form a percolated carbon black network in the cured rubber. Without being bound by theory, it is believed that the use of the ground, cured rubber, regardless of the type of grade of carbon black present therein, minimizes or at least reduces this occurrence (i.e., the formation of the percolated carbon black network), and thereby the formation of a rubber composition having a high relative permittivity. Thus, the ground, cured rubber utilized in the rubber compositions of the first, second, and third embodiments can contain any grade or type of carbon black. Preferably, in such embodiments, the ground, cured rubber composition contains up to about 40% by weight (including up to 40% by weight) of carbon black based on the total weight of the ground, cured rubber. In accordance with certain embodiments of the first, second, and third embodiments disclosed herein, the ground, cured rubber contains carbon black in an amount of about 5% to about 40%, including 5% to 40%, about 10% by about 40%, 10% to 40%, about 15% to about 35%, 15% to 35%, about 20% to about 35%, and 20% to 35% by weight based on the total weight of the ground, cured rubber.

Free Carbon Black

As discussed above, the rubber composition according to the first, second, and third embodiments disclosed herein may further comprise free carbon black. As used herein, "free carbon black" refers to carbon black, which during the formulation or compounding of the rubber, is provided as its own, separate ingredient. In other words, the free carbon black is not part of the ground, cured rubber, but instead the free carbon black is added as an ingredient in addition to the ground, cured rubber.

In accordance with certain of the first, second, and third embodiments, the rubber composition comprises from 0 to about 50 phr of free carbon black, including 0 to 50 phr, including up to about 20 phr, including up to 20 phr, including from about 10 phr to about 50 phr, including 10 to 50 phr of free carbon black, including from about 10 phr to about 45 phr, including from 10 to 45 phr, including from about 10 phr to about 40 phr, including 10 to 40 phr, including from about 10 phr to about 35 phr, including 10 to 35 phr, including from about 10 phr to about 30 phr, including 10 to 30 phr, including from about 10 phr to about 20 phr, including 10 to 20 phr, including from about 10 phr to about 15 phr, including 10 to 15 phr, including from about 20 phr to about 50 phr, including 20 to 50 phr, including from about 25 phr to about 50 phr, including 25 to 50 phr, including from about 30 phr to about 50 phr, including 30 to 50 phr, including from about 40 phr to about 50 phr, including 40 to 50 phr, including from about 45 phr to about 50 phr, including 45 to 50 phr, including from about 15 phr to about 45 phr, including 15 phr to 45 phr, including from about 20 phr to about 40 phr, including 20 phr to 40 phr, including from about 25 phr to about 35 phr, and including 25 phr to 35 phr of free carbon black.

As mentioned above, carbon black is a filler that, depending on the grade or type, may provide, or at least contribute to, a high relative permittivity in the cured rubber composition (i.e., a cured rubber composition having a dielectric constant greater than or equal to 7), thereby deteriorating the readability of the radio device surrounded by the rubber composition in the electronic communication module. This (the high relative permittivity) is believed to occur when certain grades or types of carbon blacks form a percolated carbon black network in the cured (vulcanized) rubber composition. The rubber compositions according to certain of the first, second, and third embodiments disclosed herein minimize, or at least reduce, this occurrence (i.e., the formation of the percolated carbon black network), and thereby the formation of a rubber composition having a high relative permittivity, through the selection and use of one or more free carbon black fillers having a nitrogen surface area of no more than 30 $m^2/g$ and a DBP absorption of no more than 60 $cm^3/100$ g, in the foregoing amounts. The use of one or more free carbon blacks with such properties reduces or minimizes relative permittivity of the rubber compositions of the electronic communication module according to the first, second, and third embodiments. In certain embodiments, the carbon black has a nitrogen surface area of no more than 15 $m^2/g$ and a DBP absorption of no more than 50 $cm^3/100$ g. The nitrogen surface area and the DBP absorption provide respective characterizations of the particle size and structure of the carbon black. The nitrogen surface area is a conventional way of measuring the surface area of carbon black. Specifically, the nitrogen surface area is a measurement of the amount of nitrogen which can be absorbed into a given mass of carbon black. Preferably, the nitrogen surface area is determined according to ASTM test D6556 or D3037. The DBP absorption is a measure of the relative structure of carbon black determined by the amount of DBP a given mass of carbon black can absorb before reaching a specified viscous paste. Preferably, the DBP absorption is determined according to ASTM test D2414.

Examples of suitable free carbon blacks having a nitrogen surface area of no more than 30 $m^2/g$ and a DBP absorption of no more than 60 $cm^3/100$ g include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

In the alternative or in addition, the rubber composition according to certain of the first, second, and third embodiments may further comprise one or more free carbon blacks having a nitrogen surface area of greater than 30 $m^2/g$ and a DBP absorption of greater than 60 $cm^3/100$ g, in the foregoing amounts. Unless otherwise indicated herein, such carbon blacks (i.e., those having a nitrogen surface area of greater than 30 $m^2/g$ and a DBP absorption of greater than 60 $cm^3/100$ g) are referred to herein as "reinforcing carbon blacks." These carbon blacks have a greater likelihood of forming percolated carbon black networks, and hence, increasing the relative permittivity of the rubber composition and consequently deteriorating the readability of the radio device surrounded by the rubber composition in the electronic communication module. Non-limiting examples of such carbon blacks include furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks, and conducting channel blacks. Other carbon blacks that may be utilized include acetylene blacks. Exemplary carbon blacks include those bearing ASTM designation (D-1765-82a) N-110, N-220, N-339, N-330, N-351, N-550, and N-660. In one or more embodiments, the carbon black may include oxidized carbon black.

In certain embodiments, when one or more reinforcing carbon blacks are used as free carbon blacks, up to 20 phr (in total) of reinforcing carbon black may be used. Thus, in accordance with certain embodiments of the first, second, and third embodiments disclosed herein, the rubber composition comprises free carbon blacks, and the free carbon black comprises up to 20 phr of reinforcing carbon black.

Total Carbon Black

In certain embodiments, the rubber composition according to the first, second and third embodiments disclosed herein comprise no more than about 100 phr total carbon black (including no more than 100 phr). This total amount of carbon black includes all forms of carbon black present in the rubber composition, whether provided as part of the ground, cured rubber or whether provided as the optional free carbon black. In accordance with certain of the first, second and third embodiments disclosed herein, the rubber composition comprises no more than 100 phr total carbon black, and the carbon black is provided by the ground, cured rubber; free carbon black; or combinations thereof. Furthermore, in certain of the preceding embodiments, the carbon black is provided by about 30 phr to about 100 phr (including 30 phr to 100 phr) ground, cured rubber, or about 10 phr to about 50 phr free carbon black (including 10 phr to 50 phr).

Non-Reinforcing Filler

In accordance with certain of the first, second, and third embodiments, the rubber composition may further comprise at least about 25 phr (including at least 25 phr) (in total) of at least one non-reinforcing filler, including at least about 35 phr, including at least 35 phr, including at least about 40 phr, including at least 40 phr, including at least about 50 phr, including at least 50 phr, including at least about 60 phr, including at least 60 phr, including at least about 70 phr, including at least 70 phr, including at least about 80 phr, including at least 80 phr, including at least about 90 phr, including at least 90 phr, including at least about 100 phr (in total) of at least one non-reinforcing filler. In certain of the first, second, and third embodiments, the rubber composition comprises from about 25 phr to about 100 phr (in total) of at least one non-reinforcing filler, including from 25 to 100 phr, including from about 25 phr to about 75 phr, including from 25 to 75 phr, including from about 25 phr to about 50 phr, including from 25 to 50 phr, including from about 25 to about 40 phr, including from 25 to 40 phr, including from about 50 phr to about 100 phr, including from 50 to 100 phr, including from about 75 phr to about 100 phr, including from 75 to 100 phr, including from about 90 phr to about 100 phr, including from 90 to 100 phr, including from about 35 phr to about 90 phr, including from 35 to 90 phr, including from about 45 phr to about 80 phr, including from 45 to 80 phr, including from about 50 phr to about 75 phr, and including 50 to 75 phr (in total) of at least one non-reinforcing filler.

As used herein, the term "non-reinforcing filler" refers to non-carbon black particulate material that has a nitrogen surface area of less than about 20 $m^2/g$ (including less than 20 $m^2/g$), and in certain embodiments less than about 10 $m^2/g$ (including less than 10 $m^2/g$). The nitrogen surface area of the non-reinforcing filler particulate material can be determined according to various standard methods (including ASTM D6556 or D3037). With a nitrogen surface area of less than about 20 $m^2/g$ (including less than 20 $m^2/g$), the "non-reinforcing filler" as used herein excludes most silica fillers (which are generally reinforcing, especially fumed silicas, precipiated silicas and precipitated silicates). Examples of suitable such non-reinforcing fillers include, but are not limited to, graphite, clay, titanium dioxide, magnesium dioxide, aluminum oxide ($Al_2O_3$), starch, talc, aluminum carbonate ($Al_2(CO_3)_2$, calcium carbonate ($CaCO_3$), magnesium carbonate ($MgCO_3$), calcium oxide, mica, calcium oxide, boron nitride, silicon nitride, aluminum nitride, calcium silicate ($Ca_2SiO_4$, etc.), crystalline aluminosilicates, and silicon carbide. In accordance with certain embodiments of the rubber composition according to the first, second, and third embodiments, the non-reinforcing filler is at least one of: graphite, clay, titanium dioxide, magnesium dioxide, aluminum oxide, starch, talc, aluminum carbonate ($Al_2(CO_3)_2$, calcium carbonate ($CaCO_3$), magnesium carbonate ($MgCO_3$), calcium oxide, mica, calcium oxide, boron nitride, silicon nitride, aluminum nitride, calcium silicate (or silicon carbide ($Ca_2SiO_4$, etc.), or crystalline aluminosilicates.

Silica Filler

The rubber composition according to certain embodiments of the first, second, and third embodiments disclosed herein optionally further comprises a silica filler. In particular, in certain embodiments the rubber composition according to the first, second, and third embodiments includes silica filler in an amount of 0 (optional) to about 5 phr, including 0 to 50 phr, less than about 5 phr of silica, and less than 5 phr. In other words, in certain embodiments, the rubber composition according to the first, second, and third embodiments disclosed herein includes up to about 5 phr of silica filler (including less than 5 phr).

Examples of suitable silica fillers optionally used in the rubber compositions according to the first, second, and third embodiments include, but are not limited to, precipitated amorphous silica, wet silica (hydrated silicic acid), dry silica (anhydrous silicic acid), fumed silica, calcium silicate and the like. Other suitable fillers for use in rubber compositions of certain embodiments of the first, second, and third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area of silica fillers can be determined according to various standard methods, including the BET method and ASTM D1993. In certain embodiments of the first-third embodiments disclosed herein, the rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being most preferred. In certain embodiments of the first, second, and third embodiments disclosed herein, the rubber composition comprises silica filler having a pH of about 5.5 to about 7 or slightly over 7, preferably about 5.5 to about 6.8. Commercially available silicas include HI-SIL 215, HI-SIL 233, HI-SIL 255LD, and HI-SIL 190 (PPG Industries; Pittsburgh, Pa.), ZEOSIL 1165MP and 175GRPlus (Rhodia), VULKASIL (LANXESS), ULTRASIL VN2, VN3 (Degussa), and HUBERSIL 8745 (Huber).

When silica is used in the rubber compositions disclosed herein, in certain embodiments at least one silane coupling agent may be used. In accordance with certain embodiments, the silane coupling agent is present in an amount from 0.01% to 40% by weight of the silica, including from 0.01% to 30%, including from 0.01% to 25% by weight of the silica. Generally speaking, any conventional type of silane coupling agent, can be used, such as those having a silane and a constituent component or moiety that can react with a rubber, particularly a vulcanizable rubber. The silane coupling agent acts as a connecting bridge between silica and the rubber. Suitable silane coupling agents include those containing groups such as mercapto, blocked mercapto, polysulfide, amino, vinyl, epoxy, and combinations thereof.

Elastomers

As discussed above, the rubber compositions according to the first, second, and third embodiments comprise 100 phr of at least one diene-based elastomer. As used herein, the term "diene-based elastomer" refers to a diene monomer-containing polymer, copolymer, or combination thereof (i.e., more than one polymer, more than one copolymer, one polymer and one copolymer, more than one polymer and one copolymer, more than one copolymer and one polymer, or more than one copolymer and more than one polymer). In accordance with certain embodiments according to the first, second, and third embodiments, the at least one diene-based elastomer includes a diene monomer-containing polymer, copolymer, or combination thereof derived from, for example, the polymerization of one or more of the following conjugated diene monomers: 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diene monomers may be utilized in certain embodiments. Non-limiting examples of suitable diene-based elastomers for use in the rubber compositions according to certain embodiments of the first, second, and third embodiments disclosed herein include, but are not limited to, at least one of styrene-butadiene rubber (also referred to as SBR or styrene-butadiene copolymer), polybutadiene, natural rubber, ethylene propylene diene monomer rubber (also known as EPDM rubber), butyl rubber, neoprene, or polyisoprene.

In certain embodiments according to the first, second, and third embodiments disclosed herein, the at least one diene-based elastomer of the rubber composition, particularly styrene-butadiene types of diene-based elastomers, may comprise a functionalized diene-based elastomer. As used herein, the term "functionalized diene-based elastomer" should be understood to include elastomers with a functional group at one or both terminus (e.g., from use of a functionalized initiator, a functionalized terminator, or both), a functional group in the main chain of the elastomer, and combinations thereof. For example, a silica-reactive functionalized elastomer may have the functional group at one or both terminus, in the main chain thereof, or both. In certain such embodiments, the rubber composition comprises about 5 phr to 100 phr of at least one functionalized diene-based elastomer, including 5 phr to 100 phr, about phr 5 to about 90 phr, 5 phr to 90 phr, about 5 phr to about 70 phr, 5 phr to 70 phr, about 5 phr to about 50 phr, 5 phr to 50 phr, about 5 phr to about 40 phr, 5 phr to 40 phr, about 5 phr to about 30 phr, 5 phr to 30 phr, about 10 phr to about 90 phr, 10 phr to 90 phr, about 10 phr to about 70 phr, 10 phr to 70 phr, about 10 phr to about 50 phr, 10 phr to 50 phr, about 10 phr to about 40 phr, 10 phr to 40 phr, about 10 phr to about 30 phr, and 10 phr to 30 phr. In certain embodiments according to the first-third embodiments disclosed herein, the functionalized diene-based elastomer comprises a diene-based elastomer with a silica-reactive functional group. Non-limiting examples of silica-reactive functional groups that are known to be utilized in functionalizing diene-based elastomers and that are suitable for use in the rubber compositions of certain embodiments of the first, second, and third embodiments include nitrogen-containing functional groups, silicon-containing functional groups, oxygen- or sulfur-containing functional groups, and metal-containing functional groups.

Non-limiting examples of nitrogen-containing functional groups that are known to be utilized in functionalizing diene-based elastomers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first, second, and third embodiments disclosed herein, the rubber composition comprises a functionalized diene-based elastomer having at least one functional group selected from the foregoing list of nitrogen-containing functional groups.

Non-limiting examples of silicon-containing functional groups that are known to be utilized in functionalizing diene-based elastomers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing diene-based elastomer also include those disclosed in U.S. Pat. No. 6,369,167, the entire disclosure of which is herein incorporated by reference. In certain embodiments according to the first, second, and third embodiments disclosed herein, the rubber composition comprises a functionalized diene-based elastomer having at least one functional group selected from the foregoing list of silicon-containing functional groups.

Non-limiting examples of oxygen- or sulfur-containing functional groups that are known to be utilized in functionalizing diene-based elastomers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments, the foregoing alkoxy group may be an alcohol-derived alkoxy group derived from a benzophenone. In certain embodiments according to the first, second, and third embodiments disclosed herein, the rubber composition comprises a functionalized diene-based elastomer having at least one functional group selected from the foregoing list of oxygen- or sulfur-containing functional groups.

Generally, diene-based elastomers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Optionally, the rubber composition according to the first, second, and third embodiments disclosed herein may further comprise up to about 20 phr (including up to 20 phr) of a silicone rubber elastomer. That is in certain embodiments, in addition to the 100 phr of the at least one diene based elastomer, the rubber composition comprises contains up to about 20 phr of a silicone rubber elastomer, including up to 20 phr, from 0 to about 20 phr, from 0 phr to 20 phr, including from about 5 phr to about 20 phr, including 5 phr to 20 phr, including from about 5 phr to about 15 phr, 5 phr to 15 phr, including from about 5 phr to about 10 phr, 5 phr to 10 phr, including less than about 10 phr, less than 10 phr, including less than about 5 phr, and including less than 5 phr.

Oils

The addition of certain fillers may provide desirable properties to the rubber compositions (e.g., improved elasticity, strength, etc.), but such fillers generally increase the Mooney viscosity of the rubber composition, thereby making it more difficult to process the rubber composition. In certain embodiments according to the first, second, and third embodiments disclosed herein, one or more process oils optionally may be included in the rubber composition to improve processability by reducing the Mooney viscosity. Alternatively or in addition, one or more extender oils also optionally may be added to the rubber composition formulations to soften the rubber composition. Non-limiting examples of oils used in the rubber compositions according to certain of the first, second, and third embodiments disclosed herein include paraffinic, naphthenic, aromatic process, and the like. Certain suitable oils, including the aforementioned oils, are low polycyclic aromatic content (low PCA) oils. Low PCA oils include those containing less than 3 wt %, less than 2 wt % or less than 1 wt % of polycyclic aromatic compounds (as measured by IP346). Commercially available low PCA oils include various naphthenic oils, mild extraction solvates (MES) and treated distillate aromatic extracts (TDAE), treated residual aromatic extract (TRAE), and heavy naphthenics. Suitable MES oils are available commercially as CATENEX SNR from SHELL, PROREX 15 and FLEXON 683 from EXXONMOBIL, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts and seeds. Non-limiting examples include, but are not limited to, soy or soybean oil, sunflower oil, safflower oil, corn oil, linseed oil, cotton seed oil, rapeseed oil, cashew oil, sesame oil, *camellia* oil, jojoba oil, macadamia nut oil, coconut oil, and palm oil. In accordance with certain embodiments disclosed herein, the rubber composition further comprises 0 (optional) to about 40 phr of one or more oils (process, extender, or both), including 0 to 40 phr, including from about 2 phr to about 35 phr, including from 2 phr to 35 phr, including from about 5 phr to about 25 phr, including from 5 phr to 25 phr, including from about 5 phr to about 20 phr, and including from 5 phr to 20 phr of one or more oils.

Other Additives

In certain embodiments according to the first-third embodiments disclosed herein, the rubber compositions may include other conventional rubber additives. These include, for example, oils, plasticizers, processing aids, waxes, anti-degradants such as antioxidants and anti-ozonants, tackifying resins, reinforcing resins, fatty acids, peptizers, zinc oxide, and the like. Anti-degradants are ingredients added to protect the rubber from oxidative attack. ASTM D-4676 classifies rubber anti-degradants into six classes: p-phenylenediamines (PPDs), trimethyl-dihydroquinolines (TMQs), phenolics, alkylated diphenylamines (DPAs), aromatic phosphites, and diphenylamine-ketone condensates. Unless otherwise indicated herein, suitable amounts of such components can be determined by one skilled in the art.

Cure Package

In certain embodiments of the first, second, and third embodiments disclosed herein, the rubber composition includes a cure package. Generally, the cure package includes at least one of: a vulcanizing agent, a vulcanizing accelerator, a vulcanizing activator (e.g., zinc oxide, stearic acid, and the like), a vulcanizing inhibitor, and an anti-scorching agent. In certain embodiments of the first, second, and third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain of the first, second, and third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide or sulfur olefin adducts; and insoluble polymeric sulfur. Preferably, the sulfur vulcanizing agent is insoluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, which is incorporated herein by reference. Vulcanizing agents can be used alone or in combination. Generally, the vulcanizing agents are used in an amount ranging from 0.1 phr to 10 phr, including from 1 phr to 7.5 phr, including from 1 phr to 5 phr, and preferably from 1 phr to 3.5 phr.

Vulcanizing accelerators are used to control the time and/or temperature required for vulcanization and to improve properties of the vulcanizate. Examples of suitable vulcanizing accelerators for use in the rubber compositions according to certain of the first, second, and third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 phr to 10 phr, preferably 0.5 phr to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 phr to 6 phr, preferably 0.5 phr to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 phr to 3 phr, preferably 0.5 phr to 2 phr.

Mixing

The rubber composition according to the first, second, and third embodiments may generally be prepared by mixing the ingredients together by methods known in the art, such as, for example, by kneading the ingredients together in a Banbury mixer or on a milled roll. The preparation generally includes at least one non-productive master-batch mixing stage and a final productive mixing stage. In certain embodiments, the non-productive stage includes a re-mill stage. Non-productive master-batch and re-mill stages are known to those of skill in the art and generally understood to be a mixing stage where no vulcanizing agents or vulcanization accelerators are added. The final productive mixing stage is also known to those of skill in the art and generally understood to be a mixing stage where the vulcanizing agents and vulcanization accelerators are added into the rubber composition. As used herein, the term "final batch" refers to the productive mixing stage itself, or to the rubber formulation present in this stage, in which the vulcanizing agents and vulcanization accelerators are added into the rubber composition.

The master-batch mixing stage may be conducted at a temperature of about 80° C. to about 200° C. (including 80° C. to 200° C.). The separate re-mill stage often is performed at temperatures similar to, although often slightly lower than, those employed in the master-batch stage, e.g., ramping from about 90° C. (including 90° C.) to a drop temperature of about 150° C. (including 150° C.). For purposes of this application, the term "master-batch" means the composition that is present during the master-batch stage or the composition as it exists during the re-mill stage, or both. The final, productive mixing stage, in which the curatives are charged, e.g., the vulcanizing agents and vulcanization accelerators, often is conducted at lower temperatures, e.g., starting at about 50° C. to about 65° C. (including 50° C. to 65° C.) and not going higher than about 100° C. to about 130° C. (including 100° C. to 130° C.).

Tire and Tire Components

As discussed above, the electronic communication module according to the first, second, and third embodiments is suitable for use in a tire or a tire retread and can be incorporated into the tire or tire retread. As used herein, the term "incorporated" or "incorporated into" is meant to include not only embedding or inserting into the interior portion of the tire or tire retread, but also associating with the tire or tire retread in other ways such as by the use of a patch. In certain embodiments according to the present disclosure, the patch that is used to associate the electronic communication module with the tire or tire retread is comprised of the rubber compositions disclosed herein. As discussed above, the second embodiment of the present disclosure is directed to the tire or tire retread comprising the electronic communication module of the first embodiment. In other words, the second embodiment is directed to a tire or tire retread having incorporated therein an electronic communication module with a radio device having at least a portion of its outer surface surrounded by the rubber compositions disclosed herein (i.e., according to the first embodiment disclosed herein).

In accordance with certain embodiments of the first, second, and third embodiments, the rubber composition surrounding the radio device in the electronic communication module is cured (vulcanized) prior to incorporation of the electronic communication module into the tire or tire component. According to such embodiments, the electronic communication module comprising the cured rubber composition may be inserted, embedded, or otherwise incorporated into the uncured tire or tire component. It should be understood that in the case of a tire retread, the electronic communication module comprising the cured rubber composition may be inserted, embedded, or otherwise incorporated into the new tread prior to curing the new tread, prior to applying the new tread to the reused tire casing, or prior to both. In accordance with these embodiments, the tire, tire retread or tire with the new retread is then cured with the electronic communication module incorporated therein.

Alternatively, when the rubber composition surrounding the radio device in the electronic communication module is cured prior to its incorporation into the tire or tire component, the electronic communication module may be adhered to the cured rubber composition of the tire or tire component using a patch, a suitable adhesive, or a cement capable of withstanding the operating conditions of a tire. As well, as discussed above, in certain embodiments, the patch itself comprises the rubber composition that surround at least a portion of the outer surface of the radio device. In certain embodiments, the electronic communication module can be adhered to the tire or tire component in the manner discussed in U.S. Pat. No. 5,971,046, which is incorporated herein by reference.

Furthermore, the rubber composition surrounding the radio device in the electronic communication module may be incorporated into the tire or tire retread prior to curing the rubber composition of the electronic communication module. In such embodiments, the electronic communication module comprising the uncured rubber composition (surrounding at least a portion of the outer surface of the radio device) is incorporated into the desired location of a tire or tire tread. The uncured rubber composition of the electronic module according to the first-third embodiments is then cured simultaneously along with the tire or tire tread.

Generally, when the rubber compositions disclosed herein are utilized in tires or tire retreads, these compositions are incorporated into a tire or tire retread according to ordinary tire manufacturing techniques including standard rubber shaping, molding, and curing techniques. In accordance with certain of the first, second, and third embodiments, the electronic communication module may be incorporated into a tire retread or various components of a tire (e.g., tread, sidewall, belt skim, or carcass). In certain embodiments, tires as disclosed herein can be produced as discussed in U.S. Pat. Nos. 5,866,171; 5,876,527; 5,931,211; and 5,971,046, which are incorporated herein by reference.

Method of Improving Readability

As discussed above, the third embodiment of the present disclosure is directed to a method of improving the readability of a radio device upon incorporation into a tire or tire retread. The method comprises surrounding at least a portion of the outer surface of the radio device by a rubber composition, thereby forming an electronic communication module. The rubber composition according to this embodiment comprises 100 phr of at least one diene-based elastomer, and about 20 phr to about 130 phr (including 20 phr to 130 phr) of ground, cured rubber. In accordance with certain embodiments of the third embodiment, the rubber composition has a dielectric constant at 915 Megahertz (MHz) of less than 7. As discussed above in greater detail, improving the readability of the radio device may include any or all of: increasing the readability distance of the radio device without necessarily increasing the power or energy needed to read the device, reducing or minimizing the noise or interference affecting the communication of radio device, and reducing or minimizing tuning needed for the radio device to communicate accurately and completely. Accordingly, in accordance with certain embodiments of the method of the third embodiment disclosed herein, the readability distance between the radio device in the electronic communication module and an external, remote communication device increases by surrounding at least a portion of the outer surface of the radio device by the rubber composition. In certain embodiments of the preceding embodiment, this is done without increasing the power or energy required for the communication of the radio device. Alternatively or in addition, in accordance with certain embodiments of the method of the third embodiment disclosed herein, interference or noise affecting communication between the radio device and an external, remote communication device is reduced by surrounding at least a portion of the outer surface of the radio device by the rubber composition. Further alternatively or in addition, in accordance with certain embodiments of the method of the third embodiment disclosed herein, any tuning needed for the radio device to accurately and completely communicate with an external, remote communication device is reduced or minimized by surrounding at least a portion of the outer surface of the radio device by the rubber composition. In certain embodiments according to the third embodiment, the improvement of the readability being measured is compared to the use of a rubber composition that substitutes an equivalent or roughly equivalent (within + or −25%) amount of N5 series, N4 series, or N3 series carbon black for the ground, cured rubber of the first embodiments. In certain embodiments, the comparative rubber composition not only substitutes an equivalent or roughly equivalent amount (within + or −25%) of N5 series, N4 series, or N3 series carbon black for the ground, cured rubber of the first and second embodiments, but also contains the same ingredients other than lacking any ground, cured rubber; in certain such embodiments, the comparative rubber composition also lacks any processing aid which may be added in certain embodiments according to the present disclosure to assist in blending the ground, cured rubber. In certain embodiments, the readability distance is improved by at least about 25%, including at least 25%, at least about 50%, at least 50%, at least about 100%, and associated ranges (e.g., about 25 to about 200%, 25% to 200%, etc.). The foregoing percentages of improvement in readability are based upon an increase in readability distance; for example, an improvement of 100% in readability distance means that the readability distance is doubled.

In accordance with certain embodiments according to the third embodiment, the readability of the radio device improves when a relatively larger percentage of the outer surface of the radio device is surrounded by the rubber composition of the present disclosure. Accordingly, the readability of the radio device improves as the percentage of the outer surface of the radio device that is surrounded by the rubber compositions of the present disclosure increases, e.g., as the percentage approaches and equals 100%.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the diene-based elastomers, ground, cured rubber, and other ingredients (e.g., curative package ingredients) utilized in the following examples should not be interpreted as limiting since other such ingredients consistent with the disclosure in the Detailed Description can be utilized in substitution. In other words, the particular ground, cured rubber and their amounts in the following examples should be understood to apply to the more general content of the Detailed Description. As well, the use of 100 phr of natural rubber, and 5-23 phr of N990 carbon black in Examples 2-4 should not in any way be interpreted as requiring the presence of such components in the rubber compositions disclosed herein.

The rubber compositions of Examples 1-5 were prepared according to the formulations shown in Table 1 where the amount of free carbon black filler and ground rubber was varied. The rubber compositions of Examples 1-5 were prepared according to the mixing procedure shown in Table 2. The rubber compositions of Examples 1-5 were then cured at 170° C. for 15 minutes. After calendaring to a 2 mm thickness, followed by curing, 30 mm×30 mm×2 mm samples of each rubber composition were taken. The dielectric constant at 915 MHz was measured for each cured rubber sample using a RF Impedance/Material Analyzer from Agilent Technologies (model E4991A with dielectric material test fixture 16453A). This analyzer utilizes the parallel plate method for measuring permittivity in accordance with ASTM method D150. (Operating manuals, data sheets and other related information for measurement of permittivity using the E4991A RF Impedance/Material Analyzer are available with the instrument and also on-line at www.keysight.com, with Keysight Technologies now selling Agilent brand electronic measurement instrument). The dielectric constant values are reported in Table 1 below. It should be understood that the dielectric constants (i.e., relative permittivity) of rubber compositions according to the present disclosure can be measured using different instruments, although generally measurements taken using parallel plate methods in accordance with ASTM D150 are preferred.

TABLE 1

|  | Example # | | | |
|---|---|---|---|---|
|  | 1 | 2 | 3 | 4 |
| Master-Batch | | | | |
| Natural Rubber | 50 | 50 | 50 | 50 |
| Polybutadiene | 50 | 50 | 50 | 50 |
| N990 Carbon black filler (phr) Nitrogen surface area = 8 m$^2$/g (D3037) DBP Absorption = 43 cm$^3$/100 g (D2024) | 0 | 23 | 10 | 5 |
| N330 Carbon black filler (phr) Nitrogen surface area = 83 m$^2$/g (D3037) DBP Absorption = 102 cm$^3$/100 g (D2024) | 45 | 0 | 0 | 0 |
| Naphthenic oil (phr) | 10 | 10 | 10 | 10 |
| Stearic acid (phr) | 2 | 2 | 2 | 2 |
| Anti-degradant/Anti-oxidant (phr) | 6.5 | 6.5 | 6.5 | 6.5 |
| Resin (hydrocarbon resin) (phr) | 2.5 | 2.5 | 2.5 | 2.5 |
| Ground, Cured Rubber (phr), 200 mesh[1] | 0 | 40 | 40 | 55 |
| Master-Batch #2 (Remill for Control Ex. 1)* | | | | |
| Processing Aid (phr) | 0 | 7 | 7 | 7 |
| Ground Rubber (phr) | 0 | 0 | 40 | 55 |
| Final Batch | | | | |
| Vulcanizing agent (phr) | 1.3 | 1.3 | 1.3 | 1.3 |
| Vulcanizing activator (phr) | 3.5 | 3.5 | 3.5 | 3.5 |
| Vulcanizing accelerator (phr) | 1 | 2.1 | 2.1 | 2.1 |
| Antioxidant (phr) | 2 | 2 | 2 | 2 |
| Prevulcanization inhibitor (phr) | 0 | 0.5 | 1 | 2 |
| Total phr | 173.8 | 200.4 | 227.9 | 253.9 |
| Dielectric Constant at 915 MHz | 9.7 | 4.0 | 4.0 | 4.2 |

*Control Ex. 1 was subjected to remill only (i.e., no Master-Batch #2). Ex. 2-4 were subjected to Master-Batch #2 (no remill).
[1]Ground rubber (200 mesh) sourced from passenger car and truck tires, and containing about 33% by weight carbon black.

TABLE 2

| Mixing Parameters | | |
|---|---|---|
| Stage | Time | Condition |
| Master-Batch Stage 1 (initial temperature 105° C., rotor 60 rpm) | 0 seconds | Charge elastomer |
|  | 30 seconds | Charge filler and other master-batch ingredients |
|  | 120 seconds | Clean ram |
|  | 165 seconds | Drop based on time or max temperature of 150° C. |
| Master-Batch Stage 2 (initial temperature 105° C., rotor 60 rpm) | 0 seconds | Charge Master-Batch #1 |
|  | 30 seconds | Charge Ground Rubber and other master-batch ingredients |
|  | 120 seconds | Clean ram |
|  | 165 seconds | Drop based on time or max temperature of 150° C. |
| Remill (initial temperature 105° C., rotor 60 rpm) | 0 seconds | Charge Master-Batch #1 (for Control Ex. 1) |
|  | 120 seconds | Clean ram |
|  | 165 seconds | Drop based on time or max temperature of 160° C. |
| Final Batch Stage (initial temperature 50° C., rotor rpm at 40) | 0 seconds | Charge Master Batch #2 (for Ex. 2-4) or Remill (for Control Ex. 1) |
|  | 0 seconds | Charge final batch ingredients |
|  | 60 seconds | Clean ram |
|  | 120 seconds | Drop based on time or max temperature of 100° C. |

As shown in Table 2, the rubber compositions of Examples 2-4 are prepared according to the first embodiment disclosed herein with a ground, cured rubber along with varying amounts of a N990 carbon black (which has a nitrogen surface area of no more than 30 m$^2$/g and a DBP absorption of no more than 60 cm$^3$/100 g). Example 1 is a control. The rubber composition formulation of Example 1 contains no ground, cured rubber and uses an N330 carbon black filler, the carbon black filler of which has a nitrogen surface area of greater than 30 m$^2$/g and a DBP absorption of greater than 60 cm$^3$/100 g. Table 1 shows that Examples 2-4, which contain the ground, cured rubber, all have a much lower dielectric constant (i.e., 4.0-4.2) than the control Example 1 (9.7). Furthermore, although Examples 2-4 all contain an N990 carbon black, Examples 2-4 show that a decrease in carbon black in the formulations along with a concomitant increase in ground, cured rubber does not significantly affect the dielectric constant of the formulations. Specifically, between Examples 2 and 3, where there is a decrease of 13 phr of the N990 carbon black and a 40 phr increase in ground rubber, the dielectric constant remains effectively the same at 4.0. Notably, a further 5 phr decrease in N990 carbon black and a 30 phr increase in ground rubber between Examples 3 and 4 results in a 0.2 increase in dielectric constant (i.e., from 4.0 in Example 3 to 4.2 in Example 4).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and embodiments described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. An electronic communication module for a tire comprising:
a radio device having at least a portion of its outer surface surrounded by a rubber composition, the rubber composition comprising
100 phr of at least one diene-based elastomer, and
about 20 phr to about 130 phr of ground, cured rubber,
wherein the rubber composition has a dielectric constant at 915 MHz of less than 7 and contains less than 45 phr in total of reinforcing carbon black having a nitrogen surface area of greater than 20 $m^2/g$ and less than 5 phr of silica filler.

2. The electronic communication module according to claim 1, wherein the ground, cured rubber has an average particle size of about 105 to about 74 µm.

3. The electronic communication module according to claim 1, wherein the ground, cured rubber contains carbon black in an amount of about 10% to about 40% by weight based on the total weight of the ground, cured rubber.

4. The electronic communication module according to claim 1, wherein the ground, cured rubber has an average particle size of about 50 µm to about 250 µm.

5. The electronic communication module according to claim 1, wherein the rubber composition further comprises free carbon black.

6. The electronic communication module according to claim 5, wherein the total amount of reinforcing carbon black having a nitrogen surface area of greater than 20 $m^2/g$ is no more than 20 phr.

7. The electronic communication module according to claim 1, wherein the rubber composition has a thickness of 0.5 to 3 mm.

8. The electronic communication module according to claim 1, wherein the rubber composition further comprises at least 25 phr of at least one non-reinforcing filler.

9. The electronic communication module according to claim 1, wherein the at least one diene-based elastomer comprises at least one of styrene-butadiene rubber, polybutadiene, natural rubber, ethylene propylene diene monomer rubber, butyl rubber, neoprene, or polyisoprene.

10. The electronic communication module according to claim 1, wherein the rubber composition comprises no more than about 100 phr total carbon black including both reinforcing and non-reinforcing carbon black.

11. The electronic communication module according to claim 1, wherein the rubber composition has a dielectric constant at 915 MHz of 2.5 to less than 7.

12. The electronic communication module according to claim 10, wherein the carbon black is provided by about 30 phr to about 100 phr ground, cured rubber and about 10 phr to about 50 phr free carbon black.

13. The electronic communication module according to claim 1, wherein the radio device has a majority of its outer surface surrounded by the rubber composition.

14. The electronic communication module according to claim 1, wherein the radio device has at least 95% of its outer surface surrounded by the rubber composition.

15. The electronic communication module according to claim 1, wherein the radio device comprises a transponder.

16. A tire or tire retread comprising an electronic communication module comprising
a radio device having at least a portion of its outer surface surrounded by a rubber composition, the rubber composition comprising
100 phr of at least one diene-based elastomer selected from the group consisting of styrene-butadiene rubber, polybutadiene rubber, natural rubber, and combinations thereof, and
20-130 phr of ground, cured rubber,
wherein the rubber composition has a dielectric constant at 915 MHz of less than 7 and contains less than 45 phr in total of reinforcing carbon black having a nitrogen surface area of greater than 20 $m^2/g$ and less than 5 phr of silica filler.

17. A method of improving the readability of a radio device upon incorporation into a tire or tire retread, the method comprising surrounding at least a portion of the outer surface of the radio device by a rubber composition, thereby forming an electronic communication module, the rubber composition comprising
100 phr of at least one diene-based elastomer, and
about 20 phr to about 130 phr of ground, cured rubber, and
wherein the rubber composition has a dielectric constant at 915 MHz of less than 7 and contains less than 45 phr in total of reinforcing carbon black having a nitrogen surface area of greater than 20 $m^2/g$, less than 5 phr of silica filler.

18. The method according to claim 17, wherein improving the readability comprises increasing the readability distance of the radio device.

19. The method according to claim 18, wherein the readability distance is increased without increasing power or energy required for the communication of the radio device.

20. The method according to claim 17, wherein the ground, cured rubber has an average particle size of about 50 µm to about 250 µm.

21. The method according to claim 17, wherein the at least one diene-based elastomer comprises at least one of styrene-butadiene rubber, polybutadiene, natural rubber, ethylene propylene diene monomer rubber, butyl rubber, neoprene, or polyisoprene.

22. The method according to claim 17, wherein the rubber composition has a dielectric constant at 915 MHz of 2.5 to less than 7.

23. The method according to claim 17, wherein the radio device has a majority of its outer surface surrounded by the rubber composition.

* * * * *